United States Patent [19]

Behrens

[11] 4,051,915

[45] Oct. 4, 1977

[54] NEUTRAL START AND PARK BRAKE SAFETY INTERLOCK CIRCUITRY FOR A TRACTOR

[75] Inventor: Robert Nick Behrens, Horicon, Wis.

[73] Assignee: Deere & Company, Moline, Ill.

[21] Appl. No.: 739,077

[22] Filed: Nov. 5, 1976

[51] Int. Cl.² ............................................. B60K 28/00
[52] U.S. Cl. .............................. 180/82 A; 307/10 R; 74/473 R; 123/179 K
[58] Field of Search ................. 180/82 R, 82 A, 82 B, 180/82 C; 56/10.5; 123/179 R, 179 K, 179 SE; 307/9, 10 R; 74/473 R; 192/4 A

[56] References Cited

U.S. PATENT DOCUMENTS

| | | | |
|---|---|---|---|
| 2,250,754 | 7/1941 | Dooley | 180/101 |
| 2,740,947 | 5/1956 | Davies | 180/82 A |
| 3,185,246 | 5/1965 | Maurer | 180/82 C |
| 3,229,452 | 1/1966 | Hasenbank | 180/82 R X |
| 3,715,002 | 2/1973 | Halls et al. | 180/82 A |
| 3,733,794 | 5/1973 | Allen | 56/10.5 |
| 3,736,729 | 6/1973 | Peterson | 56/10.5 |
| 3,782,084 | 1/1974 | Harkness | 56/10.5 |
| 3,969,875 | 7/1976 | Nofel | 56/10.5 X |

Primary Examiner—Kenneth H. Betts

[57] ABSTRACT

Electric control circuitry is provided for preventing a tractor engine from being started with the tractor transmission or power take-off engaged and for preventing the tractor from being driven with the park brake engaged. The control circuitry includes normally open power take-off and transmission condition sensing switches connected in series with each other and a starting solenoid and thus defining a portion of a starting circuit. These two switches in the starting circuit are respectively held closed only when a power take-off control lever is in a clutch-disengage position and the transmission shift lever is in a neutral position. The control circuitry also includes a second normally open transmission condition sensing switch connected in parallel with a normally open park brake condition sensing switch, these two switches being in series with the ignition coil and thus defining a portion of an ignition circuit. Also, these two switches are respectively held closed only when the transmission shift lever is in its neutral position and a brake pedal locking pawl is in a pedal-release position.

1 Claim, 5 Drawing Figures

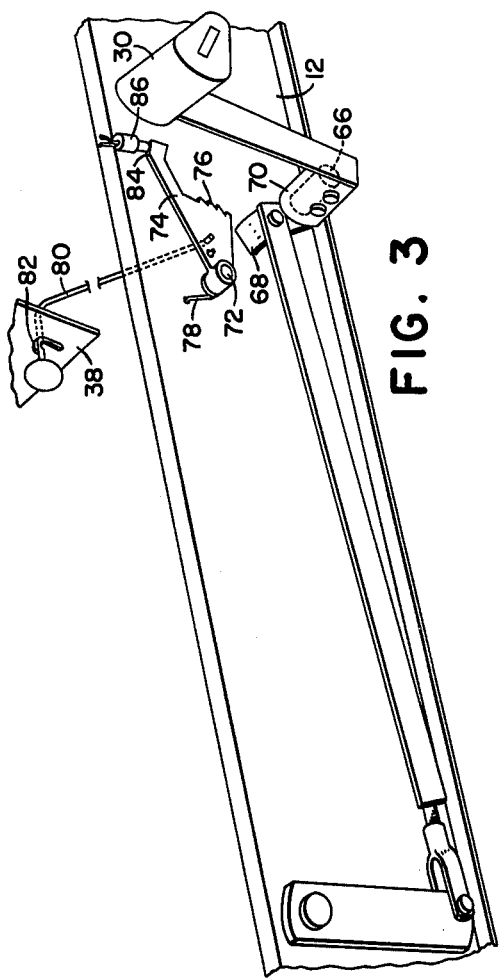
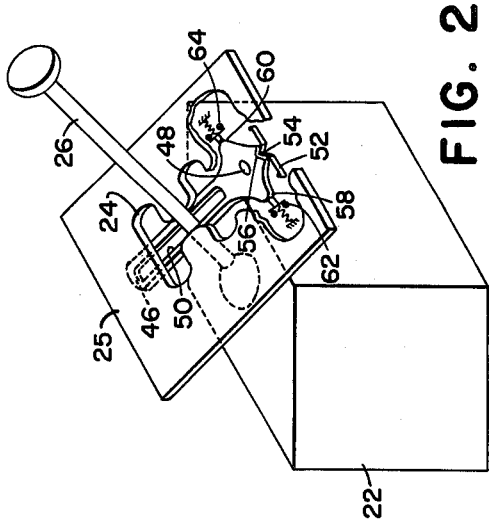
FIG. 2
FIG. 3
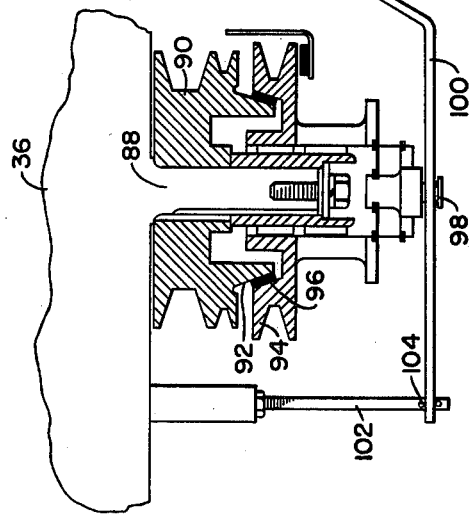
FIG. 4

NEUTRAL START AND PARK BRAKE SAFETY INTERLOCK CIRCUITRY FOR A TRACTOR

BACKGROUND OF THE INVENTION

The present invention relates to a lawn and garden tractor and more specifically relates to electric circuitry for ensuring safe and proper operation of a lawn and garden tractor.

The hazards attendant with starting a tractor having its transmission or power take-off engaged and in operating a tractor with its parking brake engaged have long been recognized. Various electrical interlock systems have been devised to avoid unsafe starting conditions (for example, see U.S. Pat. No. 3,736,729 granted to Peterson on June 5, 1973 and U.S. Pat. No. 3,782,084 granted to Harkness on Jan. 1, 1974) and various mechanical interlock systems have been devised to avoid a tractor from being operated with its park brake seet (for example, see U.S. Patent application Ser. No. 604,166 filed Aug. 13, 1975 by Welck and having the same assignee as does this case).

The electrical interlock system of the above-identified patents are not entirely satisfactory since they are grounding circuits which must be completed in order to disable the starting of the tractor. Thus, even if an unsafe condition exists, a broken electrical conductor or corroded switch contacts may open the circuit and permit starting.

The mechanical interlock of the above-identified patent application suffers from the disadvantage of being relatively expensive to fabricate since it consists of linkage including levers, rods, stops and biasing springs.

SUMMARY OF THE INVENTION

According to the present invention there is provided a novel electrical safety interlock system for a lawn and garden tractor and more specifically there is provided an electrical interlock system for preventing a tractor from being started when certain unsafe conditions exist and for preventing the tractor from being driven with its park brake engaged.

A broad object of the invention is to provide a lawn and garden tractor with a fail safe electrical safety interlock system for preventing the tractor from being started when its transmission or power take-off is engaged and for preventing the tractor from being driven with its park brake engaged.

A more specific object is to provide a circuit, as described in the immediately preceding paragraph, wherein a pair of normally open switches are connected in series with each other and with a starting solenoid and are respectively operated to closed positions in response to movement of power take-off control lever to a position for disengaging the power take-off and to movement of a shift lever to a neutral position for effecting a neutral condition in the transmission; and wherein normally open third and fourth switches are connected in parallel with each other and are connected in series with an ignition coil, the third switch also being moved to a closed position in response to the movement of the shift lever to its neutral position and the fourth switch being held in its closed position by a park brake latch when the latter is in its release position.

These and other objects will become apparent from a reading of the following description in conjunction with the appended drawings.

BRIEF DESCRIPTION OF THE DRAWINGS

FIG. 2 is a view of the tractor transmission shift lever and shift quadrant and the safety interlock switches associated therewith.

FIG. 3 is a right side view of the park brake assembly and associated safety interlock switch.

FIG. 4 is a right side view of the power take-off assembly and associated safety interlock system.

DESCRIPTION OF THE PREFERRED EMBODIMENT

Figure 1:
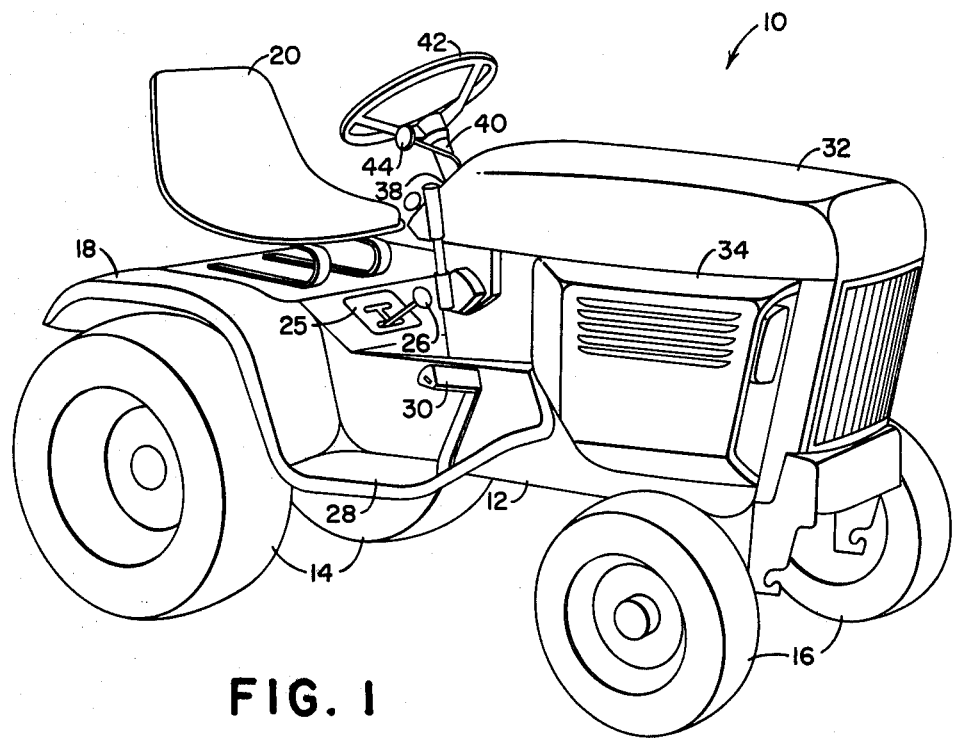
FIG. 1 is right, front perspective view of a tractor embodying the present invention.

Referring now to FIG. 1, therein is shown a lawn and garden tractor 10 of the type with which the present invention is particularly adapted to be used. The tractor 10 includes a frame 12 supported on a rear pair of drive wheels 14 and a front pair of steerable wheels 16. An integral fender, foot rest and platform structure 18 extends over, between and forwardly of the rear wheels 16 and includes a generally planar section at a central location between the wheels 14 and mounted thereon is an operator seat 20. The structure 18 overlies a transmission, shown schematically at 22 in FIG. 2, and projecting from the transmission and extending through a shift gate or quadrant 24 formed in a plate 25, supported by the tractor frame in an opening located in the structure 18 just forwardly of the seat 20, is a transmission shift lever 26.

Located at the right side of the tractor in a location adjacent a foot rest portion 28 of the structure 18 is a brake pedal 30 for selectively engaging brakes (not shown) associated with the rear wheels 14.

A hood 32 cooperates with opposite side structures 34 (only one shown) to define an engine compartment in which is located an engine, shown schematically at 36 in FIG. 4. At the rear of the hood is a control panel console 38 having a steering column 40 projecting centrally therethrough and containing a steering shaft (not shown) to the top of which is secured a steering wheel 42. Projecting through the panel 38 just rightwardly of the steering column 40 is a power take-off clutch control lever 44.

Referring now to FIG. 2, the shift lever 26 is shown in a central neutral position in the shift gate 24 wherein a corresponding neutral condition is effected in the transmission 22. A cam arm 46 is pivotally mounted, as at 48, on the underside of the plate 25, for movement parallel to the underside of the plate 25. An elongate slot 50 is provided in the arm 46 and has the lever 26 extending therethrough, the slot 50 being disposed in the fore-and-aft direction when the lever 26 is in its illustrated neutral position. A spring metal strip 52 has its opposite ends secured to the plate 25 and is located relative to the arm 46 such that a protrusion 54 formed in the strip 52 is in biased engagement with a detent notch 56 located in a peripheral surface of the arm 46 when the latter is in the position illustrated. Right and left cam surfaces 58 and 60, respectively, are formed on the periphery of the cam arm 46. A pair of normally open transmission condition sensing switches 62 and 64, having a function hereinafter described, are fixed to the plate 25 in respective positions for being actuated by the cam surfaces 58 and 60, the latter being positioned for holding the switches 62 and 64 closed when the shift lever 26 is in its neutral position shown.

Referring now to FIG. 3, the brake pedal 30 is shown pivotally mounted on the frame 12, through means of a pivot shaft 66, for fore-and-aft swinging movement between a rearward brake-release position, as shown, and a forward brake-engage position. An angled projection 68 is fixed to and extends upwardly and inwardly from the shaft 66 just inwardly of a hub 70 of the pedal 30. Pivoted on the frame 12, as at 72, above and rearwardly of the shaft 66 is a locking pawl 74 including a plurality of teeth or serrations 76 located for engaging the projection 68 and locking the brake pedal 30 in its engaged position, the service brakes then serving as parking brakes. A coil torsion spring 78 urges the pawl 74 towards a pedal-lock position and connected to the pawl 74 is a control rod 80 which projects through an inverted hook-shaped opening 82 in the panel 38 and is located in an upper end of the opening where it holds the pawl in a pedal-release position against the force exerted by the spring 78. The forward end of the pawl 74 defines a cam surface 84 which acts, when the pawl is in its pedal-release position, to engage and close a normally open switch 86 mounted on the frame 12.

Referring now to FIG. 4, it can be seen that the engine 36 has an output shaft 88 having a traction drive pulley 90 fixed for rotation therewith and drfining a conical clutch surface 92. Rotatably mounted on the shaft 88 outwardly of the pulley 90 is a power take-off pulley 94 defining a conical clutch surface 96 disposed and shaped for engagement with the surface 92. The pulley 94 includes an extension 98 which extends through and is held, in a manner not shown, in an opening provided in a clutch arm 100 between opposite ends thereof. A post 102 is fixed to the engine and supports one end of the arm 100, as at 104, such that the arm 100 is pivotable away from the engine 36 to thereby disengage the clutch surface 96 from the surface 94. A rod 106 extends through the opposite end of the arm 100 and a coil compression spring 108 acts between a washer 110 held in place on the rod by a nut 112 and the arm 100 to bias the clutch surface 96 of the power take-off pulley 94 into engagement with the clutch surface 92 of the drive pulley 90 when the rod 106 is positioned as shown in FIG. 4. Connected to the rod 106 for shifting the latter in a direction for swinging the arm 100 away from the pullely 90 so as to effect disengagement of the clutch surfaces 92 and 96 from each other is a control linkage including the control lever 44 which is pivotally mounted, as at 114, for movement between a clutch-engage position, as illustrated, and a clutch-disengage position. The opposite ends of a motion transfer link 116 are respectively pivotally connected to the lever 44 and to one end of a bell crank 118 having its other end pivotally connected to the rod 106. A nut 120 is threaded on the rod 106 and acts to engage the arm 100 to effect disengagement of the clutch surfaces when lever 44 is pivoted counter clockwise from its illustrated position to its clutch-disengage position. Mounted adjacent the panel 38 so as to be in the path of movement of the lever 44 is a normally open power take-off clutch condition sensing switch 122 which is engaged and closed by the lever 44 when the latter is moved to its clutch-disengage position.

Figure 5:
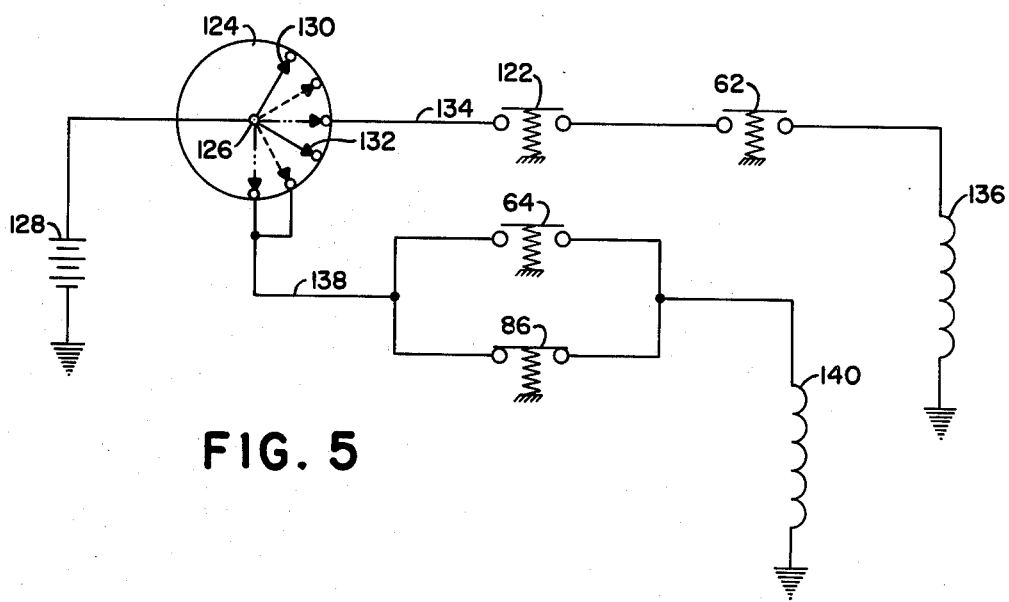
FIG. 5 is a schematic representation of the safety interlock circuitry.

Referring now to FIG. 5, therein is shown a schematic representation of a portion of the electrical circuitry of the tractor embodying the safety interlock circuitry of the present invention. Specifically, the circuitry includes a rotary ignition switch 124 including a central contact 126 connected to a battery 128 and to a pair of simultaneously rotatable conductors 130 and 132. The conductors 130 and 132 are selectively movable among an "OFF" position, as shown in solid lines, wherein they are each connected to a respective "OFF" contacts and to a "START" position, as shown in broken lines, wherein they are respectively connected to "START" and "IGNITION" contacts and a "RUN" position, as shown in dashed lines, wherein they are respectively connected to "ACCESSORIES" and "RUN" contacts. A starting circuit lead 134 is connected to the "START" contact of the switch 124 and to a coil 136 of a starter solenoid. The power take-off condition sensing switch 122 and the transmission condition sensing switch 62 are connected in the lead 134 in series with each other and the switch 124 and starter coil 136.

An ignition circuit includes a lead 138 having a branched end connected with the "IGNITION" and "RUN" contacts of the switch 124 and having its other end connected to an ignition coil 140. Connected in the lead 138 in parallel with each other is the transmission condition sensing switch 64 and the park brake condition sensing switch 86.

The operation of the safety interlock circuitry is as follows: Assuming that it is desired to start the engine 36, this can be done only if the power take-off clutch control lever is in its clutch disengage position and the transmission shift lever 26 is in its neutral position. The normally open power take-off and transmission condition sensing switches 122 and 62, respectively, in the starting circuit will then be closed and so will the normally open transmission condition sensing switch 64 in the ignition circuit. Then upon actuating the ignition switch 124 to its start position, the battery will be connected to the starter solenoid and ignition coils 136 and 140, respectively to effect engine start-up.

Since the park brake condition switch 86 is in parallel with the switch 64, it is immaterial at this point whether the switch 86 is open or closed. However, upon the transmission shift lever 26 being moved to a selected position for effecting engagement of the transmission 22, the switch 64 will open and if the control rod 80 is in its pawl-release position, the switch 86 will also be open and current flow to the ignition coil will cease resulting in the engine 36 stopping. On the other hand, if the control rod 80 is in its pawl-retain position when the transmission 22 is engaged, the switch 86 will be held in its closed position and the engine 36 will remain running to supply power to the transmission 22 for driving the wheel 14.

I claim:

1. In combination with a lawn and garden tractor including an electrically responsive engine starting means and an ignition means, a transmission shift means movable between neutral-effecting and drive-effecting positions, park brake control means movable between park brake release and park brake engage positions, and a power take-off clutch control means movable between clutch-engage and clutch-disengage positions, a safety interlock circuit, comprising: a source of electric energy; an ignition switch means connected to the source; a starting circuit including a first lead means connected between the ignition switch means and the engine starting means; a normally open power take-off clutch condition responsive switch means mounted for actuation to a closed position by the clutch control means only when the latter is moved to its clutch-disengage position; a first normally open transmission condition responsive switch means mounted for actuation to a closed position by the transmission shift means only when the latter is moved to its neutral-effecting position; said clutch condition responsive switch means and first transmission condition responsive switch means being connected between the ignition switch means and the engine starting means in the first lead means in series with each other and with the ignition switch means and the engine starting means; an ignition circuit including a second lead means connected to the ignition switch means and the ignition means; a second normally open transmission condition responsive switch means mounted for actuation to a closed position by the transmission shift means only when the latter is moved to it neutral-effecting position; a normally open park-brake condition responsive switch means mounted for actuation to a closed position by the park brake control means only when the latter is moved to its park brake disengage position; and said second transmission condition responsive switch means and said park brake condition responsive switch means being connected in said second lead means between the ignition switch means and the ignition means in parallel to each other, whereby the tractor cannot be started with the transmission or power take-off clutch engaged or driven with the park brake engaged.

* * * * *